United States Patent
Han

(10) Patent No.: US 7,924,993 B2
(45) Date of Patent: Apr. 12, 2011

(54) METHOD FOR CHARGING IN ONE NUMBER LINKS YOU SERVICE

(75) Inventor: Jianhai Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 720 days.

(21) Appl. No.: 11/718,533

(22) PCT Filed: Apr. 30, 2006

(86) PCT No.: PCT/CN2006/000886
§ 371 (c)(1),
(2), (4) Date: May 3, 2007

(87) PCT Pub. No.: WO2006/128350
PCT Pub. Date: Dec. 7, 2006

(65) Prior Publication Data
US 2009/0225975 A1    Sep. 10, 2009

(30) Foreign Application Priority Data
Jun. 1, 2005    (CN) .......................... 2005 1 0073506

(51) Int. Cl.
*H04M 15/00*    (2006.01)
*H04M 3/42*    (2006.01)
(52) U.S. Cl. .............. 379/126; 379/201.01; 379/207.05; 379/211.03; 379/211.04
(58) Field of Classification Search ............. 379/201.01, 379/211.03, 126, 211.04, 207.05, 114.28, 379/114.2, 114.17; 455/462, 461
See application file for complete search history.

(56) References Cited

U.S. PATENT DOCUMENTS

| 5,859,897 | A | 1/1999 | Furman et al. |
| 7,194,080 | B2 * | 3/2007 | Worsham et al. ........ 379/211.03 |
| 7,657,270 | B2 * | 2/2010 | Hicks et al. .................... 455/461 |
| 2003/0063733 | A1 | 4/2003 | Levine et al. |
| 2010/0056186 | A1 * | 3/2010 | Hicks et al. .................... 455/462 |

FOREIGN PATENT DOCUMENTS
CN    1422059        6/2003
CN    1549573  A    11/2004
(Continued)

OTHER PUBLICATIONS

Anonymous "Extract from: EN 301 140-1; V1.3.4 (Jun. 1999); Intelligent Network (IN); Intelligent Network Application Protocol (INAP); Capability Set 2 (CS2); Part 1: Protocol specification;" ETSI, Jun. 1999, p. 1, XP002460902 Internet, pp. 1-28; 392-395, 431-436, 471-473, 550-552.

(Continued)

*Primary Examiner* — Thjuan K Addy
(74) *Attorney, Agent, or Firm* — Slater & Matsil, L.L.P.

(57) ABSTRACT

A charging method in One Number Links You (ONLY) service includes: delivering information of simultaneous ringing numbers bonded with an ONLY number to a Service Switching Point (SSP) by a Service Control Point (SCP) of an Intelligent Network when the SCP receives a request for calling the ONLY number; initiating a call to the simultaneous ringing numbers and detecting an off-hook-and-answering number among the simultaneous ringing numbers by the SSP; and calculating charges of the off-hook-and-answering number after the call is terminated. With the charging method provided, accurate charging between an ONLY number and its bonded simultaneous ringing numbers can be implemented.

30 Claims, 2 Drawing Sheets

FOREIGN PATENT DOCUMENTS

| | | |
|---|---|---|
| CN | 1571446 | 1/2005 |
| WO | WO 98/38790 | 9/1998 |
| WO | WO 00/70858 | 11/2000 |

OTHER PUBLICATIONS

English Translation of Written Opinion of the International Search Authority, Submitted on Mar. 19, 2010.

First Office Action regarding Chinese Counterpart Application of the U.S. Application, Submitted on Mar. 19, 2010.

Second Office Action & cited reference regarding the Chinese Priority Application of the U.S. Application, Submitted on Mar. 19, 2010.

Corresponding European Application-OA1, Decision to Refuse, Oral Proceedings, Submitted on Mar. 19, 2010.

* cited by examiner

METHOD FOR CHARGING IN ONE NUMBER LINKS YOU SERVICE

FIELD OF THE INVENTION

The present invention relates to the field of communication technology, and more particularly, to a method for charging in One Number Links You (ONLY) service.

BACKGROUND OF THE INVENTION

With the development of personal communication, everybody possesses more and more communication devices, such as the mobile phone, the PHS (Personal Handyphone System) phone, the fixed telephone and the like, each of which has a different telephone number. For the convenience of users, the telecom operators provide 'ONLY' (One Number Links You) service. 'ONLY' is a kind of intelligent telephone number. An ONLY user may set different call transfer numbers according to his requirements. When someone else dials an ONLY number, the system will call the ONLY user automatically in accordance with the preset communication mode, the set order of the telephones and the way for calling so as to establish a call.

The communication mode of an ONLY user can be set as simultaneous ringing, sequential ringing or advanced ringing.

An ONLY user may register the numbers of multiple terminals in advance if he chooses the function of simultaneous ringing. When there is an incoming call, the multiple registered terminals will ring simultaneously, and after the user chooses to answer on one of the terminals, the other terminals will stop ringing. The ONLY service may support simultaneous ringing of multiple terminals, and a user may set the function according to his need.

To avoid the inconvenience of other people memorizing multiple telephone numbers, a user can publish one ONLY number, while his mobile phone, PHS and fixed telephone all being set as the ONLY-bonded (transfer) number. All the calls to the ONLY number will be automatically transferred to the bonded number (mobile phone, PHS or fixed telephone) by the system according to the user's setting. Furthermore, the bonded numbers can ring simultaneously, and the user can choose any one of the terminals to answer the call for his convenience.

Since the multiple simultaneous ringing numbers bonded with the ONLY number may be numbers in a network such as local home network, local other network, long distance telephones and the like, which possibly relates to disbursement and settlement between different networks, the charges between the ONLY number and the simultaneous ringing numbers need to be calculated during the operation of the ONLY service, and they will be calculated according to the duration of the call.

If the simultaneous ringing numbers bonded with an ONLY number is more than two, in practical applications, it is necessary to know which terminal is off-hook and answering during a call, and the corresponding charges between the ONLY number and the terminal which is off-hook and answering will be calculated according to the corresponding billing rate and the duration of the call.

However, there is no effective method provided in the prior arts to calculate the call charges between an ONLY number and simultaneous ringing numbers.

SUMMARY OF THE INVENTION

The embodiments of the present invention disclose a charging method in One Number Links You (ONLY) service to effectively calculate the charges of a call between an ONLY number and simultaneous ringing numbers.

A method for charging in ONLY service, including:
delivering information of simultaneous ringing numbers bonded with an ONLY number to a SSP (Service Switching Point) by a SCP (Service Control Point) of an Intelligent Network when the SCP receives a request for calling the ONLY number;
initiating a call to the simultaneous ringing numbers and detecting an off-hook-and-answering number among the simultaneous ringing numbers by the SSP; and
calculating charges of the ONLY number after the call is terminated.

The method further includes:
reporting the information of the off-hook-and-answering number to the SCP by the SSP when detecting an off-hook-and-answering number among the simultaneous ringing numbers by the SSP;
instructing the SSP by the SCP to calculate the charges of the ONLY number after the call is terminated,
delivering from the SCP to the SSP an Apply Charging signaling, in which the calling number is the ONLY number and the called number is the off-hook-and-answering number, when the SCP receives the information of the off-hook-and-answering number reported from the SSP.
reporting from the SSP to SCP an Apply Charging Report after the call is terminated.

The method further includes:
delivering from the SCP to the SSP a first Apply Charging signaling in which the calling number is the ONLY number and the called number is any one of the bonded simultaneous ringing numbers on receiving a request for calling the ONLY number;
determining by the SCP whether the off-hook-and-answering number is consistent with the called number in the first Apply Charging Signaling when the SCP receives the information of the off-hook-and-answering number sent from the SSP; if it is, the SCP waiting to receive an Apply Charging Report corresponding to the first Apply Charging signaling reported by the SSP; otherwise, delivering from the SCP to the SSP an second Apply Charging signaling in which the calling number is the ONLY number and the called number is the off-hook-and-answering number; overwriting the first Apply Charging signaling and reporting an Apply Charging Report corresponding to the second Apply Charging Signaling by the SSP after the SSP receives the second Apply Charging signaling.

The method further includes:
delivering from the SCP to the SSP an Apply Charging signaling in which the calling number is the ONLY number and the called number is any one of the bonded simultaneous ringing numbers when the SCP receives an answer for calling the ONLY number;
reporting the information of the off-hook-and-answering number to the SCP by the SSP when detecting an off-hook-and-answering number among the simultaneous ringing numbers by the SSP;
reporting from the SSP to the SCP an Apply Charging Report which carries charging results information, obtaining by the SCP the information of the call duration therefrom to calculate the charges of the ONLY number after the call is terminated.

The method further includes:
delivering from the SCP to the SSP multiple Apply Charging signaling in which the calling number is the ONLY number and the called numbers are the bonded simultaneous ringing numbers when the SCP receives an answer for calling the ONLY number;

reporting multiple Apply Charging Reports corresponding to the multiple Apply Charging signaling from the SSP to the SCP after the call is terminated;

finding the Apply Charging Reports with nonzero call charges and obtaining charging result information by the SCP.

The information of the simultaneous ringing numbers bonded with the ONLY number, which is delivered from the SCP to the SSP, is carried in a CONNECT message.

The step of delivering the information of simultaneous ringing numbers bonded with the ONLY number which is carried in a CONNECT message, includes filling by the SCP the first simultaneous ringing number in the destination routing address domain of the CONNECT message, and filling by the SCP the other simultaneous ringing numbers in the additional called number domains of the CONNECT message in a predefined order respectively.

The method further includes filling the serial number information of the off-hook-and-answering number by the SSP in the receiver ID parameters of the signaling which will be reported to the SCP; finding the corresponding off-hook-and-answering number by the SCP according to the serial number information on receiving the signaling.

If the ONLY number is a prepaid number, when the SCP receives an answer for calling the ONLY number, the method further includes the steps of checking available balance of an account corresponding to the ONLY number and judging whether the subsequent steps should be continued, and terminating the call and warning the subscriber of the insufficient prepayment balance by the SCP if the balance is not enough.

An apparatus for charging in One Number Links You (ONLY) service in a Service Control Point (SCP) of an Intelligent Network is further provided, which includes:

means for delivering information of simultaneous ringing numbers bonded with an ONLY number to a Service Switching Point (SSP) when the SCP receives a request for calling the ONLY number;

means for instructing the SSP to initiate a call to the simultaneous ringing numbers and detect an off-hook-and-answering number among the simultaneous ringing numbers; and means for calculating charges of the ONLY number after the call is terminated.

With the charging method provided in the present invention, the charging between an ONLY number and the simultaneous ringing numbers can be implemented simply without adding any new hardware equipments.

With the charging method provided in the present invention, the accurate charging between an ONLY number and its bonded simultaneous ringing numbers can be implemented without affecting the usage of the ONLY service, no matter whether its bonded simultaneous ringing numbers are the local home network numbers, local other networks numbers, local mobile numbers or toll telephone numbers.

For a prepaid ONLY number, the charges of a call can be budgeted in advance to control the simultaneous ringing numbers, as well as whether the present call will be connected, which will fully satisfy the requirements for charging of the operators.

DETAILED DESCRIPTION OF THE EMBODIMENTS

The present invention will be described in detail hereinafter with reference to several embodiments and the accompanying drawings.

Some embodiments of the present invention provide a method for charging between an ONLY (One Number Links You) number and the bonding simultaneous ringing numbers.

On receiving a calling request from an ONLY number, an SCP (Service Control Point) of Intelligent Network delivers the information of the simultaneous ringing numbers bonded with the ONLY number to an SSP (Service Switching Point);

The SSP initiates a call to the simultaneous ringing numbers, and determines which number among the simultaneous ringing numbers is the off-hook-and-answering number;

After the call is terminated, the SSP or the SCP calculates the charge of the ONLY number.

Figure 1:
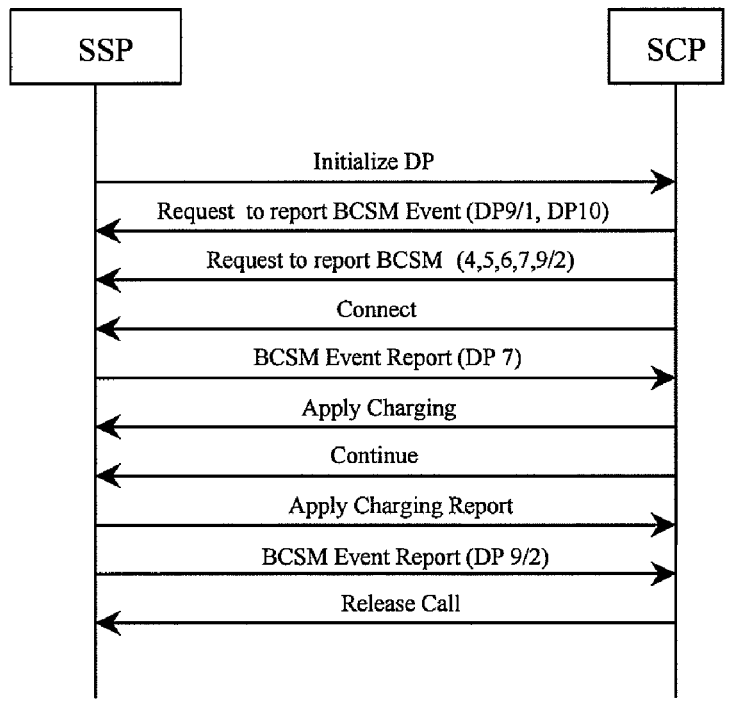
FIG. 1 is a flow chart illustrating the signaling of a first embodiment of the present invention.

FIG. 1 shows the first embodiment of the present invention.

The SSP sends a call request for calling an ONLY number to the SCP, and initializes the Detect Point (DP);

On receiving the call request which calls for the ONLY number, the SCP starts the ONLY service, and delivers the request to the SSP which is requested to report the BCSM (Basic Call State Model) Events, including: calling party disconnect Event, calling party abandon Event (DP9/1, DP10); finds out the simultaneous ringing numbers bonded with the ONLY number; and delivers a request to the SSP which is requested to report BCSM (Basic Call State Model) Events including ONLY service logical configuration DP4/DP5/DP6/DP7/DP9(2) Events, which are defined as:

DP4: routeSelectFailure, route selection fails;
DP5: oCalledPartyBusy, the called is busy;
DP6: oNoAnswer, the called has no answer;
DP7: oAnswer, answer;
DP9: oDisconnect, disconnect, which is classified into calling party disconnect, i.e., DP9(1) and called Party disconnect, i.e., DP9(2);
DP10: oAbandon;

The SCP then delivers a CONNECT message, which carries the information of the simultaneous ring numbers, to the SSP. The way by which the information is carried may be: the first simultaneous ringing number is placed in the destination route address domain of the CONNECT message, the second simultaneous ringing number is placed in the called number domain 1, the third simultaneous ringing number is placed in the additional called number domain 2 . . . and so on. On receiving the CONNECT message, the SSP initiates a call to the simultaneous ringing numbers which will begin to ring simultaneously. A certain called terminal is off-hook to answer. The SSP reports to the SCP with a DP7 signaling in which the parameter receiving SideID of LegID (ID of the receiving side) is expanded. This parameter contains 8 bits, the structure of which shall not be modified in the embodiments of the present invention, and in which only the higher 4 bits are utilized, the lower 4 bits are invariable representing the called party events. The higher 4 bits are filled with the serial number of the 25 answering subscriber. For example, 0x12 represents that the first simultaneous ringing number answers, 0x22 represents that the second simultaneous ringing number answers, 0x32 represents that the third simultaneous ringing number answers . . . and the rest may be deduced by analogy.

On receiving the DP7 signaling, the SCP finds the corresponding off-hook-and-answering number among the simultaneous ringing numbers according to the serial number carried in the DP7 signaling (since the simultaneous ringing numbers are delivered by the SCP to the SSP, the SCP knows the order of the individual numbers, which the SSP also gets to know after they are delivered to the SSP. When a certain simultaneous ringing number is off-hook, the SSP judges which number is answering and reports via the DP7 to the SCP the serial number of the answering simultaneous ring number, according to which the SCP finds the corresponding answering number), then queries the SCP charging matrix according to charging rules with the ONLY number being the calling party and the answering simultaneous ring number being the called party, and obtains the charging category (charging categories from the calling number to the called number defined according to certain service rules are stored in the charging table of the SCP, in which the different charging categories correspond to different charging rates), and delivers to the SSP an Apply Charging (AC) signaling which includes the following information: the mode for starting charging such as "immediately charging", that the calling number is the ONLY number and that the called number is the answering simultaneous ringing number, and the like.

On receiving the Apply Charging signaling, the SSP starts charging at once. When the call between the calling party and the called party is terminated, or when the calling or called party has hung up, the SSP reports an Apply Charging Report (ACR) which includes the parameters of calling number, called number, interpreter number (i.e. the practical answering number), call starting time, call terminating time, call duration, call charges, etc.

The SSP reports BCSM Events to the SCP which releases the present call on receiving the BCSM Events.

If the ONLY number is a prepaid number, on receiving an incoming call from the ONLY number, the SCP will budget whether a call of minimum duration can be made with the simultaneous ring numbers bonded with the ONLY number according to the available balance of account corresponding to the ONLY number (the charges desired by calls of minimum duration between the calling and called parties of different types are configured in the charging table of the SCP), otherwise, the corresponding numbers will not ring at the same time. If the budgeting turns out that a call of minimum duration can be made with none of the simultaneous ring numbers bonded with the ONLY, the SCP terminates the call, and preferably warns the subscriber of the insufficient balance of the prepayment.

Figure 2:
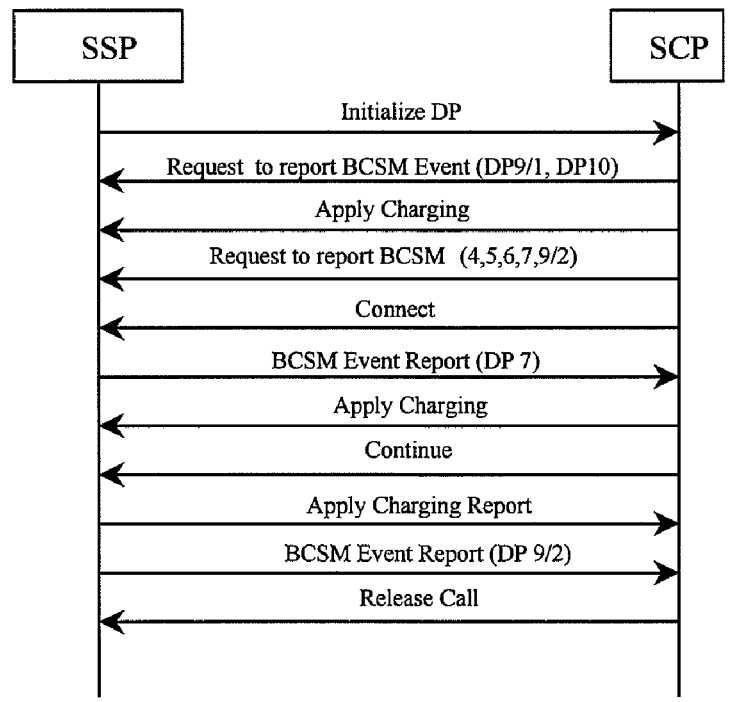
FIG. 2 is a flow chart illustrating the signaling of a second embodiment of the present invention.

FIG. 2 shows a second embodiment of the present invention.

Herein, only the differences between the signaling flow of FIG. 2 and the flow signaling of FIG. 1 are described, whereas the flows that are same will not be repeated.

Before sending a CONNECT message, the SCP delivers an Apply Charging signaling (called the first Apply Charging signaling hereinafter, for convenience's sake), in which the calling number is an ONLY number and the called number is any one of the bonded simultaneous ringing numbers (applicable to the postpaid ONLY numbers. For the prepaid ONLY numbers, the simultaneous ringing number capable of the shortest call duration should be selected as the called number in the first Apply Charging signaling, in order to monitor and control the charging). After the first Apply Charging signaling is delivered, the SSP does not connect to the calling number, but waits for the instructions delivered from the SCP after a DP7 signaling is reported, to continue the subsequent operations.

On receiving the DP7 signaling reported from the SSP, the SCP judges whether the off-hook-and-answering number is consistent with the selected called number in the first Apply Charging signaling according to the information of the off-hook-and-answering number. If it is, the SCP delivers a CONNECT message to the SSP for call connection, and waits for the SSP to report the Apply Charging Report, and obtains corresponding charging result information; otherwise, the SCP delivers to the SSP a second Apply Charging signaling in which the calling number is the ONLY number and the called number is the off-hook-and-answering number. The SSP overwrites the first Apply Charging signaling on receiving the second Apply Charging signaling. The SCP delivers a CONNECT message to the SSP again after the second Apply Charging Signaling has been delivered, and instructs the SSP to continue the subsequent operations. When the call is terminated, the SSP reports an Apply Charging Report corresponding to the second Apply Charging signaling to the SCP.

Figure 3:
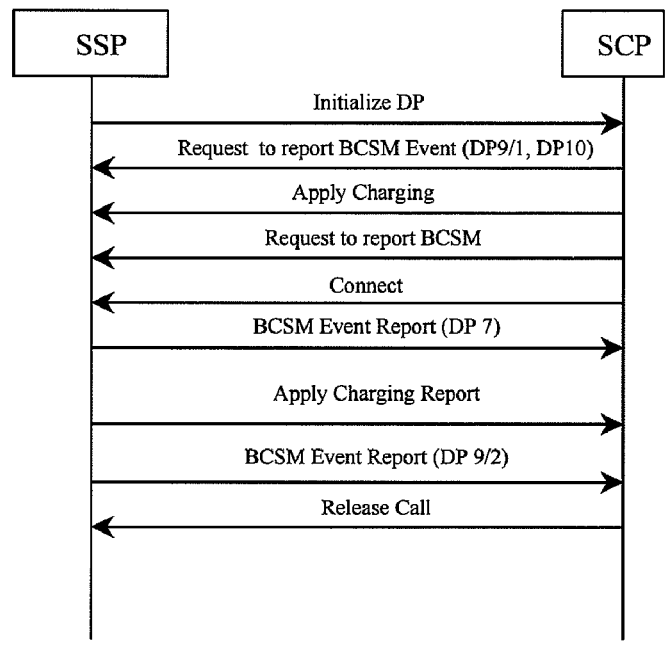
FIG. 3 is a flow chart illustrating the signaling of a third embodiment of the present invention.

FIG. 3 shows a third embodiment of the present invention.

Herein, only the differences between the signaling flow of FIG. 3 and the flow signaling of FIG. 1 are described, whereas the flows that are same will not be repeated.

Before sending a CONNECT message, the SCP delivers an Apply Charging signaling in which the calling number is an ONLY number and the called number is any one of the bonded simultaneous ringing numbers (applicable to the postpaid ONLY numbers. For the prepaid ONLY numbers, the simultaneous ringing number capable of the shortest call duration should be selected as the called number in the first Apply Charging signaling, in order to monitor and control the charging). If the ONLY number is a prepaid number, it is necessary for the SCP to check the available balance in the account corresponding to the ONLY number on receiving the answer of calling the ONLY number, and to judge whether to continue the subsequent steps. If the available balance is not enough, the SCP terminates the present call, and preferably warns the subscriber of the insufficient balance of the prepayment.

The SCP receives a DP7 signaling reported from the SSP and obtains the information of the off-hook-and-answering number carried in the signaling;

The SCP receives an Apply Charging Report reported from the SSP and obtains the duration information of the present call therein;

The SCP recharges the off-hook-and-answering number of the present call again, wherein the charging rate is the rate of the charging category corresponding to the off-hook-and-answering number and the charging duration is the duration information reported in the Apply Charging Report.

Figure 4:
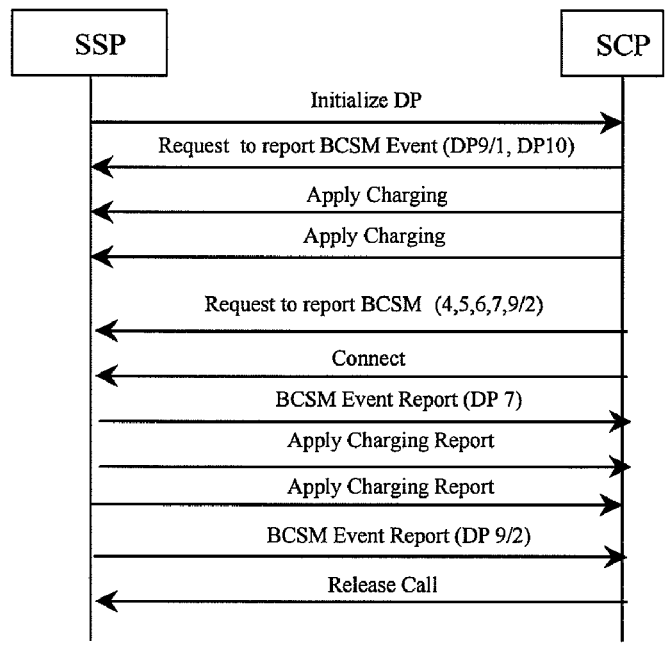
FIG. 4 is a flow chart illustrating the signaling of a fourth embodiment of the present invention.

FIG. 4 shows a fourth embodiment of the present invention.

Herein, only the differences between the signaling flow of FIG. 4 and the flow signaling of FIG. 1 are described, whereas the flows that are same will not be repeated.

Before sending a CONNECT message, the SCP delivers respectively for each of the simultaneous ringing numbers an Apply Charging signaling in which the calling number is an ONLY number and the called number is the bonded simultaneous ringing number.

The SSP reports to the SCP an Apply Charging Report for each Apply Charging signaling respectively;

The SCP checks the call charges in these Apply Charging Reports, finds the Apply Charging Reports with nonzero call charges and deducts the corresponding amount of money there from. For prepaid subscribers, the present call charges will be deducted from the account of the ONLY number.

It is apparent to the skilled in the art that various variations and modifications may be made to the present invention within the spirit and scope of the present invention, and it is intended that the present invention covers theses variations and modifications provided that they fall within the scope of the present invention as defined by the appended claims and their equivalents.

What is claimed is:

1. A method for charging in One Number Links You (ONLY) service, the method comprising:
   delivering information of simultaneous ringing numbers bonded with an One Number Links You number to a Service Switching Point (SSP) by a Service Control Point (SCP) of an Intelligent Network;
   delivering from the Service Control Point to the Service Switching Point a first Apply Charging Signal in which a calling number is One Number Links You number and a called number is any one of the bonded simultaneous ringing numbers when the Service Control Point receives a request for calling the One Number Links You number;
   initiating a call to the simultaneous ringing numbers and detecting an off-hook-and-answering number among the simultaneous ringing numbers by the Service Switching Point;
   reporting the information of the off-hook-and-answering number from the Service Switching Point to the Service Control Point when the SSP detecting the off-hook-and-answering number among the simultaneous ringing numbers; and
   determining by the Service Control Point whether the off-hook-and-answering number is consistent with the called number in the first Apply Charging Signal when the Service Control Point receives information of the off-hook-and-answering number sent from the Service Switching Point;
   if the off-hook-and-answering number is consistent with the called number, the Service Control Point waiting to receive an Apply Charging Report corresponding to the first Apply Charging Signal reported by the Service Switching Point;
   if the off-hook-and-answering number is not consistent with the called number, delivering from the Service Control Point to the Service Switching Point a second Apply Charging Signal in which the calling number is the One Number Links You number and the called number is the off-hook-and-answering number, overwriting the first Apply Charging Signal, and reporting an Apply Charging Report corresponding to the second Apply Charging Signal by the Service Switching Point after the Service Switching Point receives the second Apply Charging Signal.

2. The method according to claim 1, wherein the information of the simultaneous ringing numbers bonded with the One Number Links You number, which is delivered from the Service Control Point to the Service Switching Point, is carried in a CONNECT message.

3. The method according to claim 2, wherein the step of delivering the information of simultaneous ringing numbers bonded with the One Number Links You number which is carried in a CONNECT message, comprises:
   filling by the Service Control Point the first simultaneous ringing number in the destination routing address domain of the CONNECT message, and
   filling by the Service Control Point the other simultaneous ringing numbers in the additional called number domains of the CONNECT message in a predefined order respectively.

4. The method according to claim 3, wherein the method further comprises:
   filling the serial number information of the off-hook-and-answering number by the Service Switching Point in the receiver ID parameters of a signaling which will be reported to the Service Control Point;
   finding the corresponding off-hook-and-answering number by the Service Control Point according to the serial number information on receiving the signaling.

5. The method according to claim 1, wherein
   if the One Number Links You number is a prepaid number, when the Service Control Point receives an answer for calling the One Number Links You number, the method further comprises the steps of:
   checking the available balance of an account corresponding to the One Number Links You number and judging whether the subsequent steps should be continued;
   terminating the call and warning the subscriber of the insufficient prepayment balance by the Service Control Point if the balance is not enough.

6. An apparatus for charging in One Number Links You service in a Service Control Point (SCP) of an Intelligent Network, the apparatus comprising:
   means for delivering information of simultaneous ringing numbers bonded with an One Number Links You number to a Service Switching Point (SSP) and delivering from the Service Control Point to the Service Switching Point a first Apply Charging Signal in which a calling number is One Number Links You number and a called number is any one of the bonded simultaneous ringing numbers when the Service Control Point receives a request for calling the One Number Links You number;
   means for instructing the Service Switching Point to initiate a call to the simultaneous ringing numbers and detect an off-hook-and-answering number among the simultaneous ringing numbers;
   means for receiving the information of the off-hook-and-answering number reported from the Service Switching Point when the SSP detecting the off-hook-and-answering number among the simultaneous ringing numbers; and
   means for determining whether the off-hook-and-answering number is consistent with the called number in the first Apply Charging Signal when the Service Control Point receives information of the off-hook-and-answering number sent from the Service Switching Point;
   wherein, if the off-hook-and-answering number is consistent with the called number in the first Apply Charging Signal, the Service Control Point waits to receive an Apply Charging Report corresponding to the first Apply Charging Signal reported by the Service Switching Point; otherwise, the Service Control Point delivers to the Service Switching Point a second Apply Charging Signal in which the calling number is the One Number Links You number and the called number is the off-hook-and-answering number; and the Service Switching Point overwrites the first Apply Charging Signal and reports an Apply Charging Report corresponding to the second Apply Charging Signal after the Service Switching Point receives the second Apply Charging Signal.

7. The apparatus according to claim 6, wherein the information of the simultaneous ringing numbers bonded with the One Number Links You number, which is delivered from the Service Control Point to the Service Switching Point, is carried in a CONNECT message.

8. The apparatus according to claim 7, wherein the means for delivering the information of simultaneous ringing numbers bonded with the One Number Links You number which is carried in a CONNECT message, is further adapted to:
   fill the first simultaneous ringing number in the destination routing address domain of the CONNECT message, and
   fill the other simultaneous ringing numbers in the additional called number domains of the CONNECT message in a predefined order respectively.

9. The apparatus according to claim 8, further comprising:
   means for finding the corresponding off-hook-and-answering number according to serial number information carried in a signaling reported by the Service Switching Point.

10. The apparatus according to claim 6, further comprising:
    means for checking the available balance of an account corresponding to the One Number Links You number and judging whether the subsequent steps should be continued if the One Number Links You number is a prepaid number; and
    means for terminating the call and warning the subscriber of the insufficient prepayment balance if the balance is not enough.

11. A method for charging in One Number Links You (ONLY) service, the method comprising:
    delivering information of simultaneous ringing numbers bonded with an One Number Links You number to a Service Switching Point (SSP) by a Service Control Point (SCP) of an Intelligent Network;
    delivering from the Service Control Point to the Service Switching Point an Apply Charging Signal in which a calling number is One Number Links You number and a called number is any one of the bonded simultaneous ringing numbers when the Service Control Point receives a request for calling the One Number Links You number;
    initiating a call to the simultaneous ringing numbers;
    detecting an off-hook-and-answering number among the simultaneous ringing numbers by the Service Switching Point;
    reporting information of the off-hook-and-answering number from the Service Switching Point to the Service Control Point when the SSP detecting the off-hook-and-answering number among the simultaneous ringing numbers; and
    reporting from the Service Switching Point to the Service Control Point an Apply Charging Report which carries charging results information and obtaining by the Service Control Point information of the call duration therefrom to calculate the charges of the One Number Links You number after the call is terminated.

12. The method according to claim 11, wherein the information of the simultaneous ringing numbers bonded with the One Number Links You number, which is delivered from the Service Control Point to the Service Switching Point, is carried in a CONNECT message.

13. The method according to claim 12, wherein delivering the information of simultaneous ringing numbers comprises:
    filling by the Service Control Point the first simultaneous ringing number in the destination routing address domain of the CONNECT message, and
    filling by the Service Control Point the other simultaneous ringing numbers in the additional called number domains of the CONNECT message in a predefined order respectively.

14. The method according to claim 13, further comprising:
    filling the serial number information of the off-hook-and-answering number by the Service Switching Point in the receiver ID parameters of a signaling which will be reported to the Service Control Point; and
    finding the corresponding off-hook-and-answering number by the Service Control Point according to the serial number information on receiving the signaling.

15. The method according to claim 11, wherein if the One Number Links You number is a prepaid number, when the Service Control Point receives an answer for calling the One Number Links You number, the method further comprises:
    checking the available balance of an account corresponding to the One Number Links You number and judging whether the subsequent steps should be continued; and
    terminating the call and warning the subscriber of the insufficient prepayment balance by the Service Control Point if the balance is not enough.

16. An apparatus for charging in One Number Links You service in a Service Control Point (SCP) of an Intelligent Network, the apparatus comprising:
    means for delivering information of simultaneous ringing numbers bonded with an One Number Links You number to a Service Switching Point (SSP) and delivering to the Service Switching Point an Apply Charging Signal in which a calling number is One Number Links You number and a called number is any one of the bonded simultaneous ringing numbers when the Service Control Point receives an answer for calling the One Number Links You number when the SSP the Service Control Point receives a request for calling the One Number Links You number;
    means for instructing the Service Switching Point to initiate a call to the simultaneous ringing numbers and detect an off-hook-and-answering number among the simultaneous ringing numbers;
    means for receiving the information of the off-hook-and-answering number reported from the Service Switching Point when the SSP detecting the off-hook-and-answering number among the simultaneous ringing numbers; and
    means for receiving an Apply Charging Report reported from the Service Switching Point, obtaining information of the call duration therefrom to calculate the charges of the One Number Links You number after the call is terminated.

17. The apparatus according to claim 16, wherein the information of the simultaneous ringing numbers bonded with the One Number Links You number, which is delivered from the Service Control Point to the Service Switching Point, is carried in a CONNECT message.

18. The apparatus according to claim 17, wherein the means for delivering the information of simultaneous ringing numbers bonded with the One Number Links You number which is carried in a CONNECT message, is further adapted to:
    fill the first simultaneous ringing number in the destination routing address domain of the CONNECT message, and
    fill the other simultaneous ringing numbers in the additional called number domains of the CONNECT message in a predefined order respectively.

19. The apparatus according to claim 18, further comprising:
means for finding the corresponding off-hook-and-answering number according to serial number information carried in a signaling reported by the Service Switching Point.

20. The apparatus according to claim 16, further comprising:
means for checking the available balance of an account corresponding to the One Number Links You number and judging whether the subsequent steps should be continued if the One Number Links You number is a prepaid number; and
means for terminating the call and warning the subscriber of the insufficient prepayment balance if the balance is not enough.

21. A method for charging in One Number Links You (ONLY) service, the method comprising:
delivering information of simultaneous ringing numbers bonded with an One Number Links You number to a Service Switching Point (SSP) by a Service Control Point (SCP) of an Intelligent Network;
delivering from the Service Control Point to the Service Switching Point multiple Apply Charging Signals in which a calling number is One Number Links You number and called numbers are the bonded simultaneous ringing numbers when the Service Control Point receives a request for calling the One Number Links You number;
initiating a call to the simultaneous ringing numbers;
detecting an off-hook-and-answering number among the simultaneous ringing numbers by the Service Switching Point;
reporting multiple Apply Charging Reports corresponding to the multiple Apply Charging Signals from the Service Switching Point to the Service Control Point after the call is terminated; and
finding the Apply Charging Reports with nonzero call charges and obtaining charging result information by the Service Control Point.

22. The method according to claim 21, wherein the information of the simultaneous ringing numbers bonded with the One Number Links You number, which is delivered from the Service Control Point to the Service Switching Point, is carried in a CONNECT message.

23. The method according to claim 22, wherein the step of delivering the information of simultaneous ringing numbers bonded with the One Number Links You number which is carried in a CONNECT message, comprises:
filling by the Service Control Point the first simultaneous ringing number in the destination routing address domain of the CONNECT message, and
filling by the Service Control Point the other simultaneous ringing numbers in the additional called number domains of the CONNECT message in a predefined order respectively.

24. The method according to claim 23, wherein the method further comprises:
filling the serial number information of the off-hook-and-answering number by the Service Switching Point in the receiver ID parameters of a signaling which will be reported to the Service Control Point;
finding the corresponding off-hook-and-answering number by the Service Control Point according to the serial number information on receiving the signaling.

25. The method according to claim 21, wherein
if the One Number Links You number is a prepaid number, when the Service Control Point receives an answer for calling the One Number Links You number, the method further comprises the steps of:
checking the available balance of an account corresponding to the One Number Links You number and judging whether the subsequent steps should be continued;
terminating the call and warning the subscriber of the insufficient prepayment balance by the Service Control Point if the balance is not enough.

26. An apparatus for charging in One Number Links You service in a Service Control Point (SCP) of an Intelligent Network, comprising:
means for delivering information of simultaneous ringing numbers bonded with an One Number Links You number to a Service Switching Point (SSP) and delivering to the Service Switching Point multiple Apply Charging Signals in which a calling number is One Number Links You number and called numbers are the bonded simultaneous ringing numbers when the Service Control Point receives a request for calling the One Number Links You number;
means for instructing the Service Switching Point to initiate a call to the simultaneous ringing numbers and detect an off-hook-and-answering number among the simultaneous ringing numbers;
means for receiving multiple Apply Charging Reports corresponding to the multiple Apply Charging Signals sent from the Service Switching Point after the call is terminated; and
means for finding the Apply Charging Reports with non-zero call charges and obtaining charging result information.

27. The apparatus according to claim 26, wherein the information of the simultaneous ringing numbers bonded with the One Number Links You number, which is delivered from the Service Control Point to the Service Switching Point, is carried in a CONNECT message.

28. The apparatus according to claim 27, wherein the means for delivering the information of simultaneous ringing numbers bonded with the One Number Links You number which is carried in a CONNECT message, is further adapted to:
fill the first simultaneous ringing number in the destination routing address domain of the CONNECT message, and
fill the other simultaneous ringing numbers in the additional called number domains of the CONNECT message in a predefined order respectively.

29. The apparatus according to claim 28, further comprising:
means for finding the corresponding off-hook-and-answering number according to serial number information carried in a signaling reported by the Service Switching Point.

30. The apparatus according to claim 26, further comprising:
means for checking the available balance of an account corresponding to the One Number Links You number and judging whether the subsequent steps should be continued if the One Number Links You number is a prepaid number; and
means for terminating the call and warning the subscriber of the insufficient prepayment balance if the balance is not enough.

* * * * *